United States Patent [19]

Trutor

[11] 4,104,988
[45] Aug. 8, 1978

[54] ARTICULATED ENCLOSURE

[76] Inventor: John Trutor, Benson, Vt.

[21] Appl. No.: 709,664

[22] Filed: Jul. 29, 1976

[51] Int. Cl.² .............................................. A01K 39/00
[52] U.S. Cl. .................................... 119/51 R; 119/23
[58] Field of Search ................................ 119/23, 51 R

[56] References Cited

U.S. PATENT DOCUMENTS

| | | | |
|---|---|---|---|
| D. 117,053 | 10/1939 | Straus | 119/23 U X |
| 1,522,815 | 1/1925 | George | 119/23 |
| 1,710,947 | 4/1929 | Payne | 119/23 |

Primary Examiner—Hugh R. Chamblee
Attorney, Agent, or Firm—Charles L. Lovercheck

[57] ABSTRACT

A structure suitable for use as a bird house, bird feeder, pet house or children's play house made up of long flitches that define both sides and ends of an enclosure. The ends of the long flitches of each side overlying the ends of the long flitches in each adjacent side defining short flitches are disposed in the spaces between the long flitches. A rod extending through the ends of the long flitches in each said corner and through a top supported over said enclosure and bottom of the enclosure.

1 Claim, 12 Drawing Figures

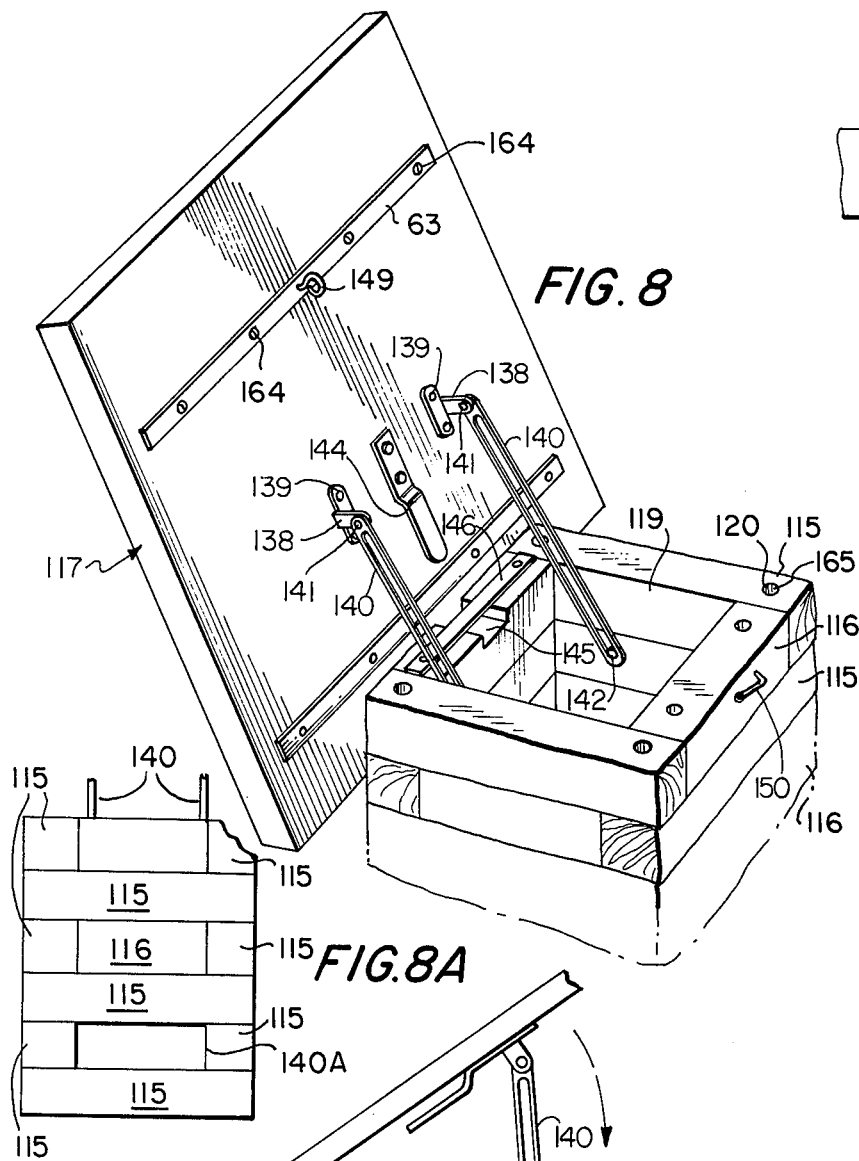
FIG. 8
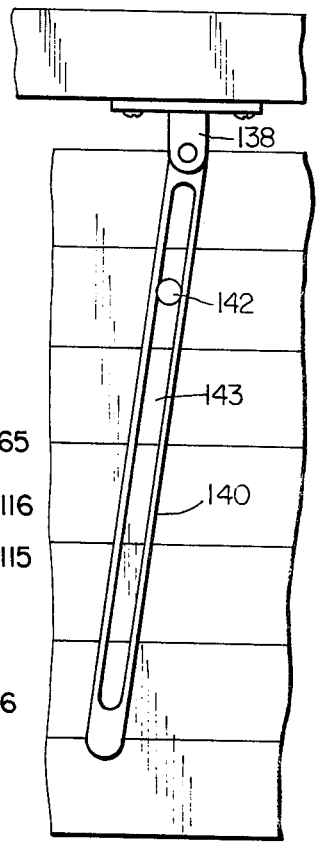
FIG. 9
FIG. 8A
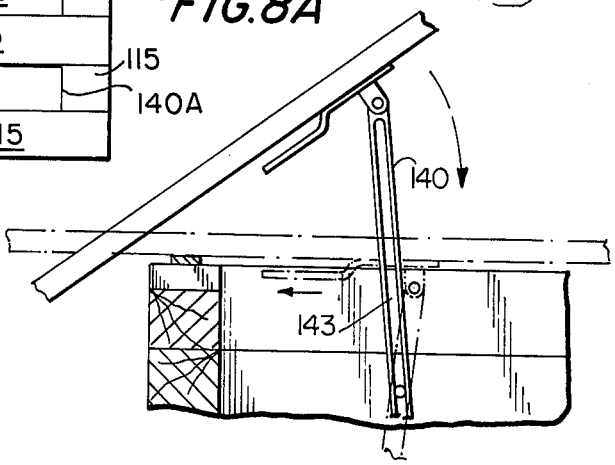
FIG. 10
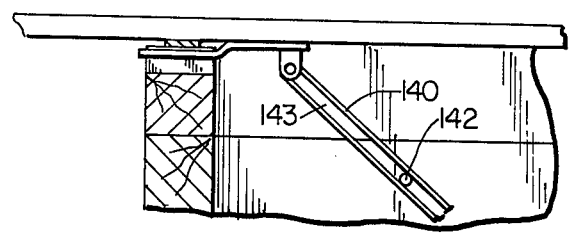
FIG. 11

ARTICULATED ENCLOSURE

GENERAL STATEMENT OF DESIGN

An architectural design for wood structure for outdoor use, employing wood flitches as primary material and various specially formed and off-shelf hardware, embodying substantial flexibility for arrangement of its parts, and providing for sturdy, safe, weather-resistant, easily-emplaceable, attractive structures having a wide range of uses and of many sizes. The design is readily and responsively conformable to standards for bird houses recommended by nationally-recognized authorities for various wild bird species with regard to cavity dimensions, entrance sizes and locations, resistance to excessive heat and air currents, ease of inspection and cleaning of the interior, and security. With minor modification, the bird houses are convertible to easily-fillable bird feeders of such varying sizes and conformations as to enable selectivity as to capacity and species to be fed. Additional simple modifications, principally involving elimination of certain features incorporated into the bird house and bird feeder structures, produce children's play houses and pet houses. The individual units for all uses are readily susceptible to assembly into compartmented or expanded structure.

OBJECTS OF THE INVENTION

It is an object of the invention to provide an improved wood structure, useful for occupancy by wild birds, children or pets, or useful for feeding wild birds.

Another object of the invention is to provide a structure that is readily modifiable to provide a wide range of sizes including ready adaptability of individual units to assembly into compartmented or expanded units, accurately responsive as to various bird species to structural standards recommended by authorities such as the United States Fish & Wildlife Service and National Audubon Society. These structural standards are:
sturdily built, having a normal life of many years,
having construction features that minimize integrant hazards;
architecturally aesthetic, attractive to prospective occupants and harmoniously concordant in residential and other environs,
with features enabling easy access to the interior for inspection and cleaning,
easily emplaceable within a wide range of locations,
which, as to incidental benefit, utilizes material not only of that wasted by lumber mills but also abandoned in unsightly piles.

The the above and other objects in view, the present design consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the design.

GENERAL DESCRIPTION OF THE DRAWINGS

FIG. 8 is an isometric view of the cover of the bird feeder.

FIG. 8A is a front view similar to FIG. 1 showing the bird feeder.

FIG. 9 is an enlarged, partial view of the hinge, side and cover.

FIG. 10 is a partial view of the bird house showing the top in a partially open position.

FIG. 11 is similar to FIG. 10, showing the top completely closed.

DETAILED DESCRIPTION OF THE DRAWINGS

Figure 1:
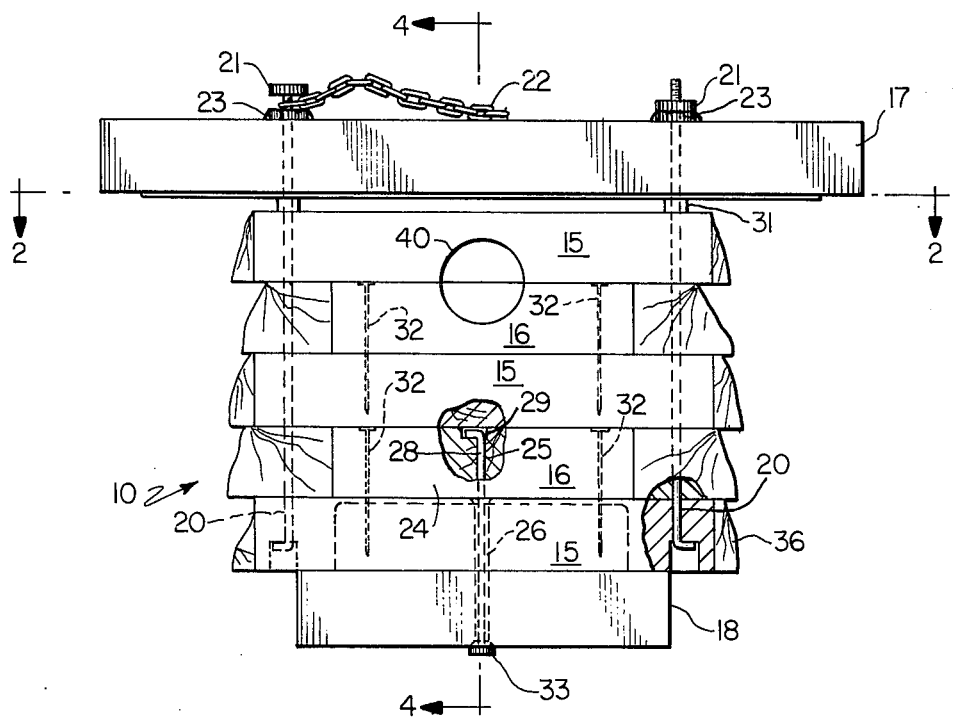
FIG. 1 is a front view of a bird house according to the invention.
Figure 2:
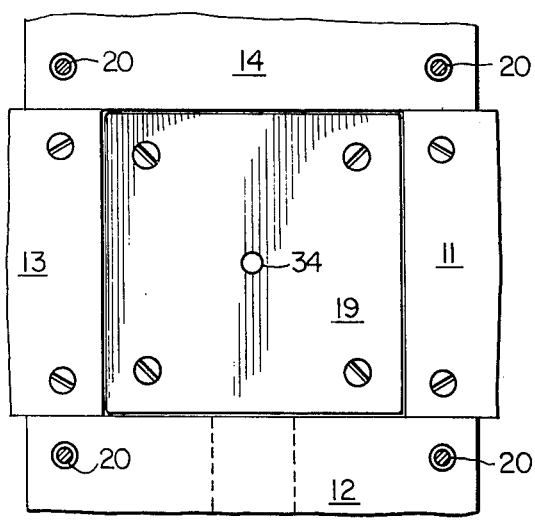
FIG. 2 is a cross-sectional view taken on Line 2—2 of FIG. 1.
Figure 3:
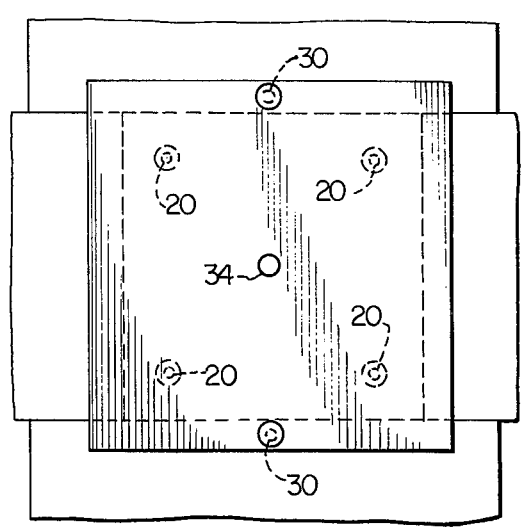
FIG. 3 is a bottom view of the bird house.
Figure 4:
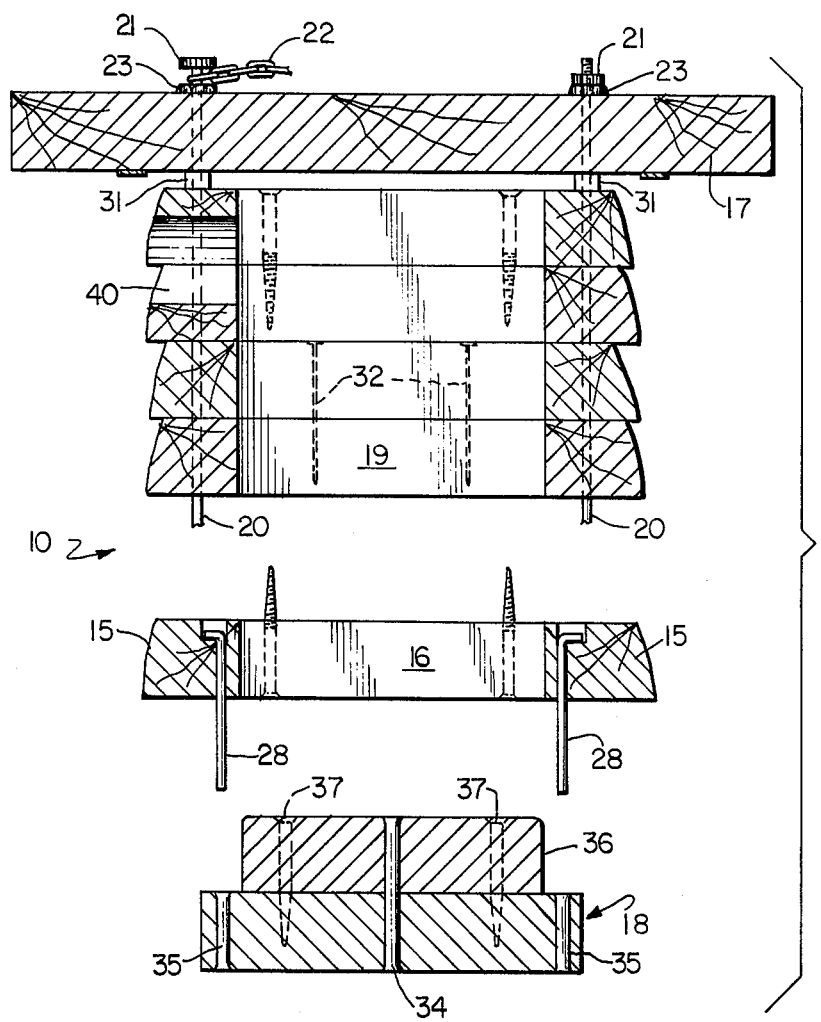
FIG. 4 is an exploded view of the bird house.
Figure 5:
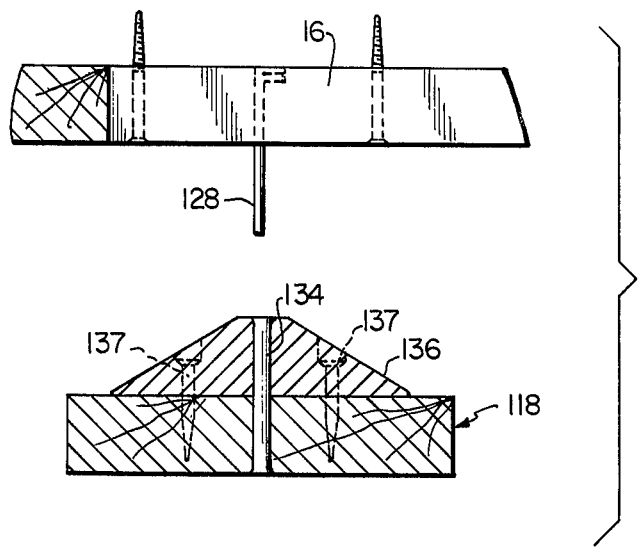
FIG. 5 is an exploded view partly in cross section showing the bottom of a feeder and a top flitch according to the invention.
Figure 6:
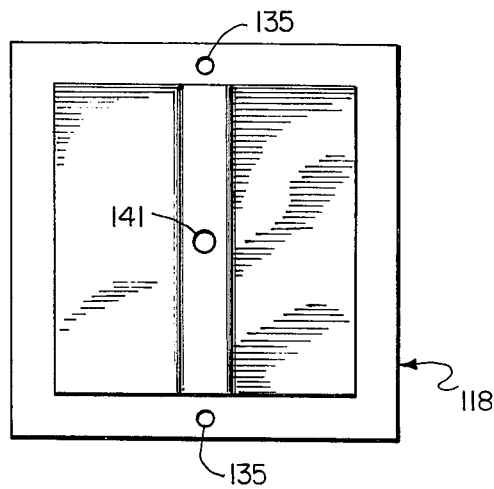
FIG. 6 is a top view of the bird feeder with cover removed.

The architectural design shown in FIGS. 1-4 is an embodiment of a bird house structure according to the invention, the bird house being selected as listing in the abstract herein. The bird house has four sides 11, 12, 13 and 14, each comprising several courses of long flitches 15 and short flitches 16. The bird house is completed by the roof 17 and bottom assembly 18, shown in the detailed configuration in FIGS. 3 and 5. The long flitches 15 are layed up to form the four sides in log cabin fashion, defining a cavity 19. The ends of the long flitches 15 each have a hole bored in them in each corner, and a rod 20 bent at 90° at its lower end is received in a counterbore in the lowermost flitch. The rod 20 extends upwardly and through the spacers 31 and through the roof 17 and have a washer 23 and nut 21 on their upper ends. Two of the nuts 21 may extend through the chain 22 for hanging the bird house. The flitches 15 are longer than the flitches 16 by thickness dimensions and the short flitches fill the spaces between the long flitches.

The cavity 19 may be, for example, 4 inches × 4 inches and the number of flitches are determined by the height of the cavity desired and the thickness of the flitches.

The internal cubic measurement of the cavity conforms to the cavity standards represented by the U.S. Fish & Wildlife Service and by the Audubon Society for various wildlife species. All of the long flitches 15 may be drilled at the same time after they are stacked.

The bottom is held in place by bottom rods 28 and nuts 33. The two lower flitches 24 of short flitches 16 on each side have a hold 25 bored at a midpoint and rods 28 extending through them. The upper end of rod 28 is bent and received in the counterbore 29 in the next to the lower-most short flitch 24, the rods extending down through bushings 26 in the holes 30 in the lower ply 35 of the floor 18, thereby holding the floor in place.

The entrance opening 40 is of a size to accomodate the size of the bird expected to occupy the house. The short flitches 16 are held together by the nails 32 and suitable tube 34 is supported at the center of the bottom, extending upwardly therethrough to receive a lag bolt, providing a suitable mounting for a bracket to support the bird house on a post or the like. The bottom assembly 18 is made up of lower ply 35 held to upper ply 36 by screws 37.

The bird feeder is generally similar to the bird house. The body of the bird feeder to be used with the upper long flitch 15 and short flitch 16 shown in FIG. 8 is identical to the bird house shown in FIGS. 1-4 with the exception that the first course up from the bottom, the first penultimate short flitch 116 of the feeder corresponding to flitch 16 of the bird house on each side is deleted, thus, providing an opening 140A for bird access to the food in the feeder. The upper ply 136 rests on lower ply 35 and bushings, similar to bushings 26, are located in lower ply 135 of the bottom 118 bird feeder inclined toward the opening.

The roof 117, shown in FIGS. 8-11 in several position between open and closed, has the brackets 138 held to it by screws 139 and the brackets 138 are held to straps 140 by rivets 141. Straps 140 are slidably held to the inner sides of the enclosure by screws 142 received in slots 143. Thus, the roof may be swung backward relative to the feeder to the position shown in FIG. 8 and may be lifted to an open position shown in FIG. 10 approximately overlying the bird feeder. Then, the brackets 144 may engage the notches 145 in the feeder which bar 146 overlies and the cover can be slid into position and held in place by hook 150.

Figure 7:
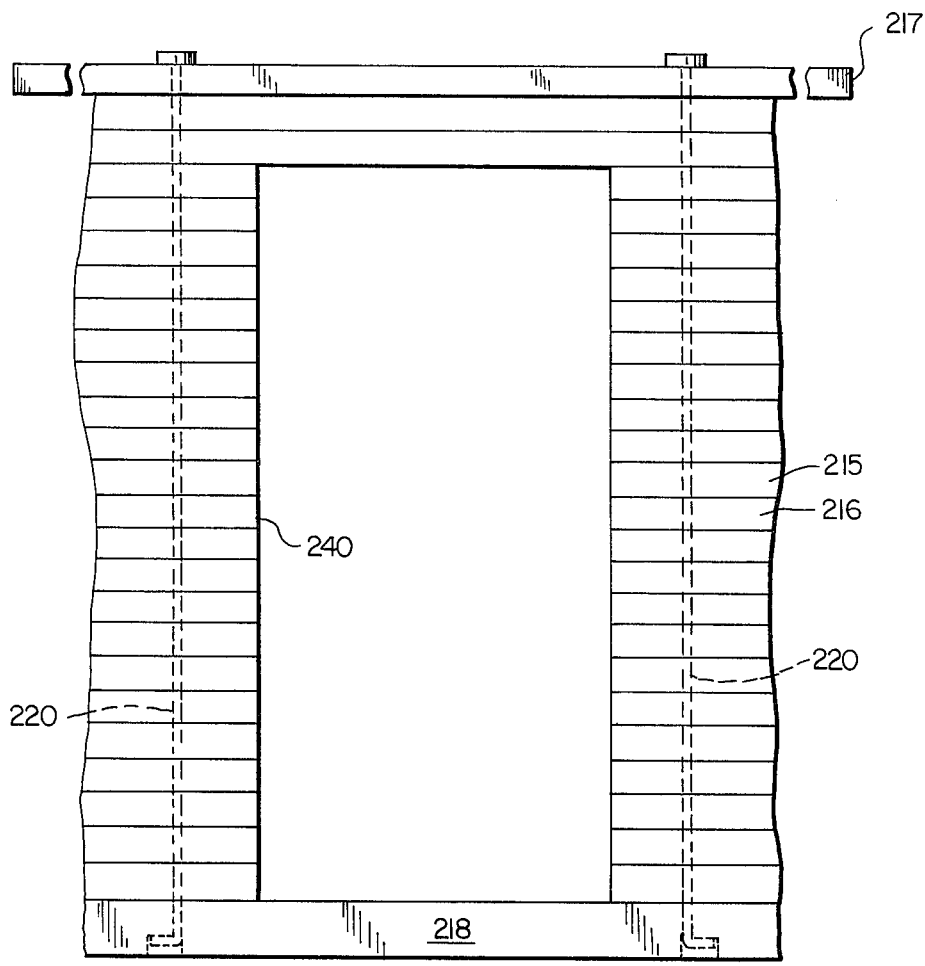
FIG. 7 is a front view of a play house, constituting another embodiment of the invention.

The play house shown in the embodiment of FIG. 7 has flitches 215 and 216 as in the other embodiments. Door opening 240 is provided in the front wall of the house. The rods 220 extend through a floor, or wide flitch 218, and through the roof 217 and are held in place by nuts 232 at the top. Rods similar to the rods 20 at the corners of the embodiments of the bird house and feeder are used at each corner of the play house to hold the flitches together. A floor may rest on the lower wide flitches if desired.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An enclosure providing a feeder for birds having four walls disposed generally at right angles to each other and constructed of long flitches arranged as a cribwork with interstices between said long flitches,
   short flitches disposed in said interstices filling said interstices,
   the ends of said long flitches in two said walls opposite each other crossing the ends of the said long flitches forming two other said walls,
   said ends of said long flitches at each corner having a hole extending therethrough,
   long rods,
   said long rods extending through the said holes at each said corner,
   means on each said long rod securing said long flitches together at said corners,
   a floor underlying said walls,
   at least two short rods,
   each said short rod extending through at least one of said long flitches adjacent said floor in a said wall and through said floor and means on said short rod securing said floor to said enclosure,
   a cover,
   hinge means swingably and slidably connecting said cover to said cribwork,
   said hinge means comprising,
   strap means,
   said strap means being swingably connected to said cover and swingably and slidably connected to two of the walls of said enclosure,
   a bracket fixed to the underside of said cover,
   the rear end of said bracket means being offset and spaced downwardly from said cover,
   a notch in one of said enclosure walls,
   said notch being adapted to receive said offset end of said bracket for holding said cover in closed position,
   an opening means in said walls in said enclosure providing access to feed in said feeder by birds.

* * * * *